(12) United States Patent
Segall et al.

(10) Patent No.: US 8,594,309 B2
(45) Date of Patent: Nov. 26, 2013

(54) MANAGING INTERACTIVE COMMUNICATIONS CAMPAIGNS WITH CUSTOMER RECOVERY

(75) Inventors: Timothy R. Segall, Lexington, MA (US); Chris Bohlin, Bedford, MA (US)

(73) Assignee: Soundbite Communications, Inc., Bedford, MA (US)

( * ) Notice: Subject to any disclaimer, the term of this patent is extended or adjusted under 35 U.S.C. 154(b) by 0 days.

(21) Appl. No.: 13/346,860

(22) Filed: Jan. 10, 2012

(65) Prior Publication Data
US 2012/0281825 A1 Nov. 8, 2012

Related U.S. Application Data

(60) Provisional application No. 61/431,468, filed on Jan. 11, 2011.

(51) Int. Cl.
*H04M 3/523* (2006.01)
*G06Q 10/00* (2012.01)

(52) U.S. Cl.
USPC ............ 379/265.11; 379/266.07; 705/7.12

(58) Field of Classification Search
USPC .......................................... 705/7.12
See application file for complete search history.

(56) References Cited

U.S. PATENT DOCUMENTS

| | | | |
|---|---|---|---|
| 4,988,209 A | 1/1991 | Davidson et al. | |
| 5,008,930 A | 4/1991 | Gawrys et al. | |
| 5,825,870 A | 10/1998 | Miloslavsky | |
| 5,963,635 A | 10/1999 | Szlam et al. | |
| 5,991,395 A | 11/1999 | Miloslavsky | |
| 6,285,752 B1 | 9/2001 | Rice | |
| 6,363,145 B1 | 3/2002 | Shaffer et al. | |
| 6,621,900 B1 | 9/2003 | Rice | |
| 6,842,772 B1 | 1/2005 | Delaney et al. | |
| 6,931,112 B1 | 8/2005 | McFarland et al. | |
| 6,980,640 B2 | 12/2005 | Rice | |
| 7,103,562 B2 | 9/2006 | Kosiba et al. | |
| 7,110,524 B2 | 9/2006 | Rupe et al. | |
| 7,184,521 B2 | 2/2007 | Sikora et al. | |
| 7,386,102 B2 | 6/2008 | Summe et al. | |
| 8,270,575 B2 * | 9/2012 | Segall et al. | 379/88.11 |
| 8,270,594 B2 | 9/2012 | Segall et al. | |
| 8,280,031 B2 | 10/2012 | Segall et al. | |
| 8,379,834 B2 | 2/2013 | Weinstein et al. | |
| 2001/0025329 A1 | 9/2001 | Sheikh et al. | |
| 2004/0029638 A1 | 2/2004 | Hutcheson et al. | |
| 2005/0169235 A1 | 8/2005 | Hutcheson et al. | |
| 2007/0172050 A1 | 7/2007 | Weinstein et al. | |
| 2008/0235342 A1 | 9/2008 | Aaltonen et al. | |
| 2011/0123016 A1 * | 5/2011 | Segall et al. | 379/266.07 |
| 2011/0129081 A1 * | 6/2011 | Segall | 379/266.07 |

* cited by examiner

*Primary Examiner* — Harry Hong
(74) *Attorney, Agent, or Firm* — David H. Judson

(57) ABSTRACT

A campaign strategy manager (CSM) component for a hosted communications campaign system allows users to define more granular and specific campaign strategies, including pass escalation for alternative channels (e.g., text and email) and/or based upon attempt results, contact attributes and response group data. The campaign strategy manager allows users to define pass strategies statically and dynamically, to manage lists across multiple campaigns, and to view results in real-time. A defined strategy is a static strategy created by a user for a particular campaign that, once created, typically is not modified. A dynamic strategy is one where, during the course of a day (e.g., as a sub-campaign is running), a user may alter the defined strategy, preferably just for that day (or portion thereof). The CSM may be used to implement a recovery strategy using a dialer pass.

6 Claims, 9 Drawing Sheets

MANAGING INTERACTIVE COMMUNICATIONS CAMPAIGNS WITH CUSTOMER RECOVERY

This application is based on and claims priority to Ser. No. 61/431,468, filed Jan. 11, 2011.

BACKGROUND OF THE INVENTION

1. Technical Field

This disclosure relates generally to a method and system for managing interactive communication campaigns over a computer network, such as the Internet.

2. Description of the Related Art

It is known to provide a web-based hosted solution through which business entities create and manage interactive or notification communications campaigns. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. The hosted solution typically is implemented as an application (or "managed") service provider. One or more business entities ("clients") that desire to use the service typically register and access the service through an on-line (e.g., web-based) portal. In one representative use scenario, the managed service provider entity provides outbound telemarketing services on behalf of participating clients. The campaign typically is provisioned by the client. Thus, for example, using a web-based interface, a participating client defines a script for the campaign, imports a set of contacts (typically, the client's actual customers), and defines one or more parameters that govern how the campaign is to be run. At a designated time, the service provider initiates the campaign, e.g., by providing the contacts to a set of telephone servers that set-up and manage the telephone calls to the targets of the campaign. During a given outbound call, as noted above, a recipient (a "customer") may be afforded an option to connect to a contact center, e.g., to speak to a customer representative. In such implementations, the hosted solution typically is integrated directly with the contact center's on-premises automatic call distributor (ACD).

BRIEF SUMMARY

A web-based hosted solution (a managed service or system) through which business entities create and manage communications campaigns, such as interactive campaigns that afford target recipients an opportunity to be connected to a contact center. The managed service carries out a communications campaign on behalf of a client. A "campaign" refers to a series of calls to a contact list using one or more sub-campaigns. A sub-campaign associates a list of contacts, a script, and a timeframe. An "agent" typically is a contact center operator. A "skill group" is a set of agents that are trained to handle a given script. According to this disclosure, a campaign strategy manager (CSM) component allows customers to define more granular and specific campaign strategies, including pass escalation for alternative channels (e.g., text and email) and/or based upon attempt results, contact attributes and response group data. The campaign strategy manager allows users to define pass escalation strategies statically and dynamically, to manage lists across multiple campaigns, and to view results in real-time. A defined strategy is a static strategy created by a user for a particular campaign that, once created, typically is not modified. A dynamic strategy is one where, during the course of a day (e.g., as a sub-campaign is running), a user may alter the defined strategy, preferably just for that day (or portion thereof). In particular, the campaign strategy manager enables the user to make changes to the current strategy (including, for example, as a function of attempt results, contact attributes and/or response group data) as a sub-campaign is running through a particular list.

A customer recovery strategy as described herein enables a business entity customer of the hosted service to use the CSM to implement a "dialer pass," which is a voice pass in which a call recipient is connected immediately to an available agent, preferably without any script interaction. This strategy addresses a scenario where the call recipient, although otherwise available, hangs up on an AVM call.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

FIG. 6 is a display interface for creating a new campaign pass; and

FIG. 10 is a display interface for defining the dialer pass; and

DETAILED DESCRIPTION

Figure 1:
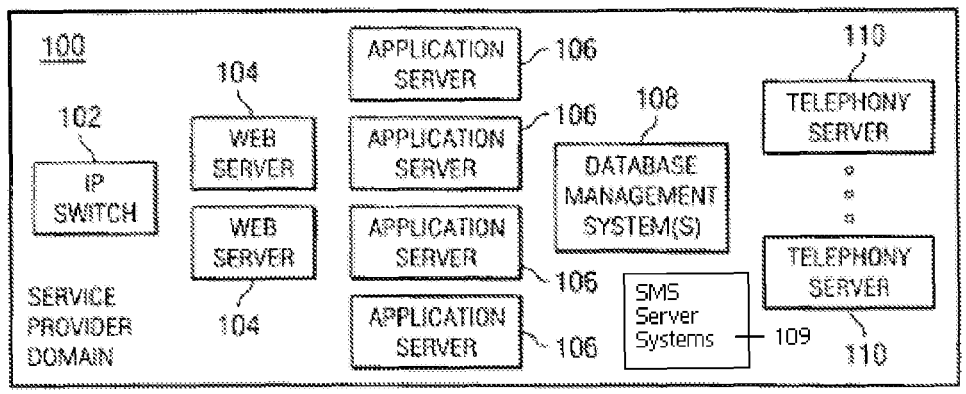
FIG. 1 is a block diagram of a service provider infrastructure for implementing a managed communications campaign service.

FIG. 1 illustrates a representative service provider or system architecture, which in the preferred embodiment is implemented in or across one or more data centers. A data center typically has connectivity to the Internet. The system provides a web-based hosted solution through which business entities create and manage communications campaigns. Campaigns may be interactive or non-interactive. Representative campaigns include, without limitation, account renewal campaigns, balance transfer or consolidation offer campaigns, billing issue campaigns, credit card activation campaigns, fraud alert campaigns, payment or past due reminder campaigns, phone or customer survey campaigns, debt recovery campaigns, late payment with right party verification campaigns, payment reminder with direct connect to contact center campaigns, appointment reminder campaigns, welcome campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, and the like. The particular type of campaign is not a limitation or feature of the invention.

A business entity (a "client") user has a machine such as a workstation or notebook computer. Typically, a business entity user accesses the service provider architecture by opening a web browser on the machine to a URL associated with a service provider domain. Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, a set of one or more SMS servers 109, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as WebLogic 10.3 (or later). The database management system 108 may be implemented as an Oracle (or equivalent) database management package running on Linux. A representative telephony server machine is an application server that implements appropriate software applications for call set-up, voice processing, and other call connection and management activities. An application may implement the Media Resource Control Protocol (MRCP). In the alternative, a telephony server machine may execute an application server in conjunction with one or more PSTN, VoIP and/or voice processing cards that provide interconnectivity for telephone-based calling applications. In a card-based embodiment, a representative card is a CG 6565 (or variant) series available from Dialogic, or an equivalent. Typically, a voice processing application port or card has a finite number of supported ports. In a high volume call environment, there may be several web server machines, several application server machines, and a large number of telephony server machines. Although not shown in detail, the infrastructure may include a name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. The telephony servers 110 handle most telephony-related functions including, without limitation, executing outbound calls and forwarding calls to a contact center. The particular hardware and software implementation details described herein are merely for illustrative purposes are not meant to limit the scope of the present invention.

In a representative embodiment, a typical machine in the service infrastructure is a processor-based server running Linux, and the server includes a telephone interface. A typical interface has up to 240 ports, and each port may be considered a separate telephone line. There are typically a set of such servers operating at a given location (e.g., an Internet data center). The following is a typical operation of the service. Using a Web browser or the Web service API, a client provisions a campaign, provisioning a script to be played to a target customer. The scope and content of the script will depend on the campaign. The client also provides the service provider with contact information for a set of persons, who are the target recipients of the campaign. In operation, the system batches a subset of those contacts to one of the machines in the server farm. A control routine executing on the machine takes a first contact in the subset and assigns the contact to an available port. The script is then initiated and the interface card initiates a call over a port. When the recipient's phone is answered, the system determines whether a human being has answered the call (as opposed to an answering machine, a fax, or the like). If a human being has answered, the script plays a set of prompts (basically a set of scripted questions). During the call, if the target recipient takes a given action, a direct-connect (DC) function is initiated. In particular, the system places the call on hold, opens up a separate line to a contact center telephone number (typically provisioned by the client), waits for an agent to respond, places the responding agent on hold, and then bridges the customer to the agent. The system then disconnects. In an alternative, the DC function may take place whether or not the recipient actively initiates it, e.g., by just having the system inform the recipient to "please hold" while the connection to the contact center is established by the service provider.

The contact center may be owned, operated or managed by a third party. The service provider may own, operate or manage the agents directly. A representative contact center includes automatic call distribution (ACD) functions. As is well-known, an ACD is a computer-implemented and controlled telephone system that distributes calls to contact center agents equitably and gathers statistics about the agents. When the service provider controls and/or manages the agents directly, the provider infrastructure may include a dialer, which is an automatic telephone dialing system. A dialer initiates outbound call from a list of telephone numbers, turns a call over to an agent when a human being responds, and gathers statistics about agents. Such ACD and dialer technologies are well-known.

Figure 2A:
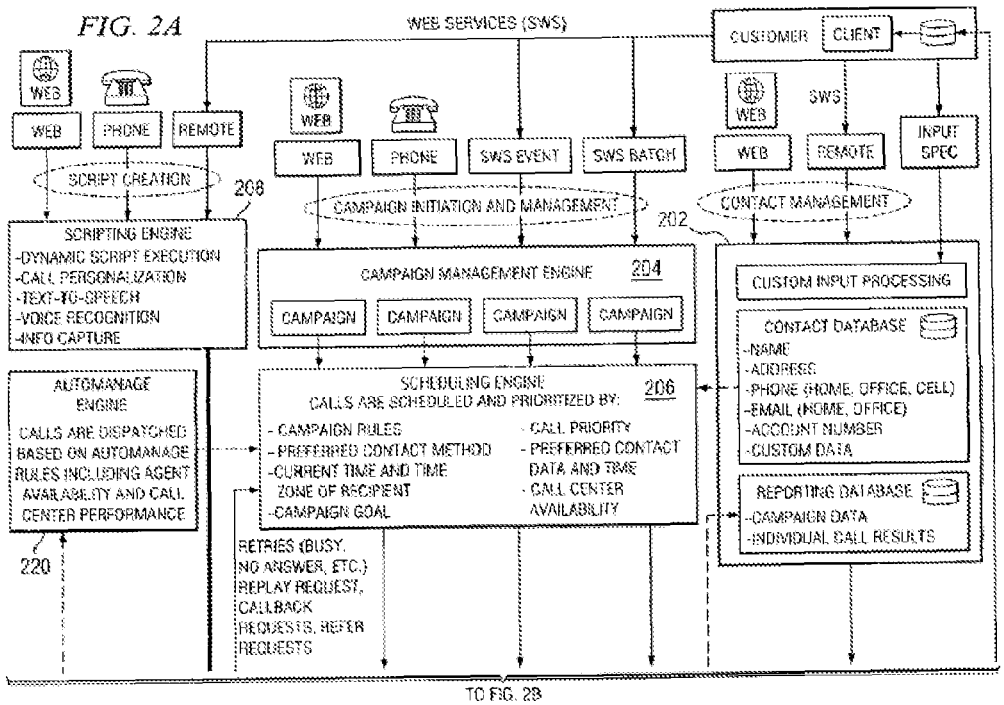
FIGS. 2A-2B illustrates how an interactive communications campaign is created and managed in the service provider infrastructure illustrated in FIG. 1.
Figure 2B:
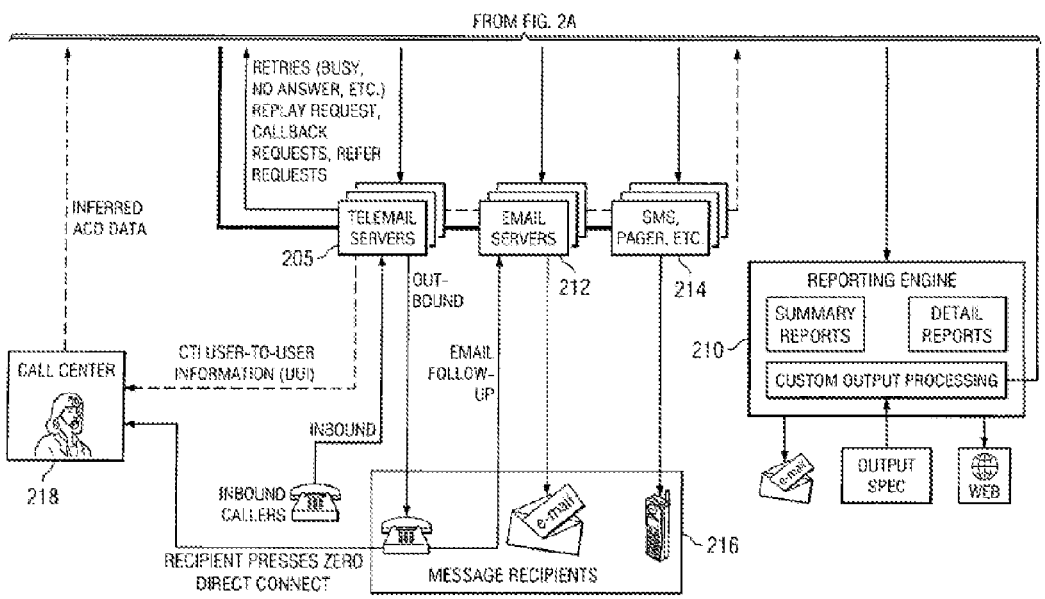

Using the service provider infrastructure, a business entity can create, execute and manage a campaign. As noted above, a campaign may have associated therewith one or more "sub-campaigns." Using a Web interface, a client loads a list of contacts who will be called and associates that list with a script. A "sub-campaign" refers to one or more passes through a contact list that has been bound to a script and that has been associated with a given timeframe. Thus, a "sub-campaign" associates at least the following items: a list of contacts, a script, and a timeframe. Additional details regarding sub-campaigns are set forth below. As noted above, a script determines what will happen during a phone call. Typically, a script is formatted as XML and specifies a sequence of audio prompts that are played and what happens when the recipient takes certain actions such as pressing a button on the phone or speaking a response. As noted above, a direct connect to the contact center may be carried out automatically (merely when the system determines that the call has been answered by other than an answering machine) and thus the script may designate this functionality. One or more contact lists are stored in a contact database, and typically a contact list comprises a set of contacts. A contact typically is an individual in the contact database, and this individual is sometimes referred to as the "customer" (as, technically, the individual is a customer of the client using the managed service). A contact can include home, work or cell numbers, a client identifier, an email address, or the like. Also, contacts typically include first name, last name, company and other information. With reference to FIGS. 2A-2B, and as described above, a business entity connects to the service provider, authenticates, and then uses one or more applications to create, execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone.

As also illustrated in FIGS. 2A-2B, after connecting an outbound call to a target customer 216, the customer may elect to be connected to the contact center 218 (typically a third party contact center) or the system may perform that direct connect automatically once it determines that a human being (as opposed to an answering machine) has answered the outbound call. The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This "indirect" connectivity is illustrated in FIG. 2 by the control engine 220, which can be provided in software as a set of software instructions executable on a processor. The engine is responsible for dispatching messages at an appropriate rate while ensuring that all customer-requested rule parameters (as described below) are honored. Examples of such parameters include: number of agents available at the contact center, maximum hold time at the contact center, client abandon rate prior to speaking to a contact center, number of bad numbers reached on the outbound dial, and so forth. Generally, for a given client campaign or sub-campaign, the engine 220 decides on an initial message dispatch rate based on the client-requested parameters (and, optionally, on historical data from like campaigns or sub-campaigns). Once the campaign or sub-campaign, as the case may be, starts running, the engine 220 monitors the parameters and ensures that they remain within tolerance. If an identified parameter exceeds the client-defined value, then a system action rule (e.g., adjusting the message dispatch rate, suspending the sub-campaign, or the like) is applied and any client notification requested is issued. Additional details regarding the functionality of the engine 220 are described in U.S. Publication No. 2007/0172050, which is commonly-owned.

As noted above, preferably a web-based interface is provided to enable a business entity client to create a set of one or more management rules that, when triggered during the campaign, cause the infrastructure (and, in particular, certain control applications therein) to take certain control actions in real-time, preferably based on campaign performance. A campaign may include several preset strategies that a client may choose to change based on day of week or time of day.

As used herein, the following terms have the associated meanings. A "campaign" refers to an overall series of messages to a contact list using one or more sub-campaigns that use a given script. Campaigns also act as templates for the sub-campaigns that are created under them. A campaign typically has a preset configuration that applies to all of its sub-campaigns. As noted above, a "sub-campaign" refers to one or more passes through a contact list using a script and that is constrained to a particular timeframe (or at a set of one or more such times). A sub-campaign typically runs under an existing campaign. A "script" as noted above determines what happens during a customer interaction. Commonly, the script specifies a sequence of audio prompts that are played to a client (an end user who receives a call) and what happens (the contact center connection) when the recipient takes certain actions (such as pressing a button on the phone or speaking an answer to a query). The script may also specify other actions, such as effecting a contact center connection automatically when detecting that a human being has answered. The nature and type of actions set forth in a script thus may be quite varied, and this disclosure is not limited to any particular process flow within a script.

An "agent" typically is a contact center operator. A "skill group" is a set of agents that are trained to handle a given script. In one embodiment, a skill group defines the number of agents who are scheduled to be on duty at various times of the day on various days of the week, as well as the phone number to use to contact those agents. A skill group can be shared across multiple sub-campaigns or over multiple physical facilities (e.g., telephone numbers). A script may cause the routing of direct connect calls to different skill groups based on the path through the script. A client of the service may assign a skill group to a sub-campaign when it creates the sub-campaign, whereupon the agents in that skill group are then responsible for handling any incoming messages for that sub-campaign. Agents in a skill group become "live" according to a schedule or upon login to the service provider. Thus, in one embodiment a "live" agent is an agent that has been registered with the service provider, e.g., using a supervisor dashboard or a contact center schedule. A "busy" agent is an agent currently assisting a client. An "available" agent is an agent waiting for work. A "break" is a state when the agent is away from his or her station. The acronym "ACW" refers to "after-call-work" or agent processing, which occurs after a particular customer service is completed and before the agent is servicing a new customer.

In one embodiment, agents in a skill group may be automatically allocated to a particular sub-campaign based on a priority of each running sub-campaign. This is not a requirement, however. Thus, for example, sub-campaigns with a higher priority are given as many agents as they can use before a lower-priority sub-campaign is considered. Sub-campaigns of equal priority are allocated agents according to a number of agents that can be used (or the number of available contacts) in a next time period (e.g., 5 minutes). In the alternative, such prioritization of sub-campaigns need not be enforced across agents in a skill group, thereby enabling more equal access to the agents. The agents allocated to each sub-campaign typically changes over time as the number of available contacts changes (which affects the number of agents that can be used by each sub-campaign). Preferably, the system adjusts the rate for a sub-campaign based on several factors: the number of agents currently allocated to the sub-campaign, the percentage of attempts that result in a direct-connect attempt, and an average length of a successful direct connect call.

Agent allocation is not a requirement. In the alternative, agents in a skill group are either taking a call or are idle. They may receive a call from any sub-campaign currently assigned to the skill group. In this embodiment, a priority value determines if a particular sub-campaign should be dialed at a faster rate than another. This results in one sub-campaign generating more direct-connects and requiring more agents from the pool of available agents.

Typically, a skill group is based on one or more business requirements. For example, skill groups may be based on skill type, language skills, skill level, or other such factors. When a new sub-campaign is created, a skill group is assigned to that sub-campaign. The schedule for the skill group then determines the messaging rate at any given time. As more agents come on duty, typically the rate increases to keep those agents busy. When fewer agents are on duty, however, the rate decreases to avoid long hold queues for the customers. As noted above, a single skill group can be assigned to multiple sub-campaigns at the same time. Calls from each sub-campaign preferably are sent to any available agent in the skill group, so a given agent should be trained to handle calls from each of the sub-campaigns.

There may be different types of skill groups: a standard skill group, and an enhanced agent mode skill group. The standard skill group typically is a skill group to which a single phone number is assigned, and that number is a default phone number when there is no other number defined in the script. A standard skill group typically does not use a service-side hold queue, as defined below. With a standard skill group, agents always hang up after the client call has completed. Caller ID can be used to generate an agent screen pop-up window with the correct customer information if the client's infrastructure supports the capability. As an alternative, an audible "whisper" with customer information can be played for the agent prior to completing the connection. With an enhanced shared mode skill group, the agents typically conform to a pre-defined schedule, and the schedule automatically changes the number of agents throughout the day. In this configuration, agents share one or more telephone numbers, and a schedule may be created for each phone number (alternatively, multiple phone numbers can share a schedule). Agents may take advantage of a service-side hold queue to "stay-on-line" (remain connected and to receive a next customer after the last customer hangs-up). If agents remain connected, caller ID typically is not used for the screen pop-up because, typically, caller ID cannot be changed after the first call the agent's phone has been placed. If the enhanced agent mode skill group mode is used, contacts connect directly to a specific agent who has his or her own unique telephone number. Thus, when this type of skill group is configured, individual agents are added (by name) together with the associated telephone numbers. In this configuration, each agent has a unique phone number, or each agent may be set up with a different extension where one or more agents share the unique phone number. As with the standard mode configuration, agent mode skill groups use a pre-defined schedule. Individual agents, however, can each have a custom schedule or can participate in a common schedule group. The service provider can track individual agent activity in this mode, and agents use the hold queue and can stay-on-line as described above. In this mode, caller ID is not used for an agent screen pop-up window, and agents who are not actively allocated to a running sub-campaign are identified as unassigned.

Enhanced Campaign Strategy Management

The hosted service also includes a campaign strategy management (CSM) module that is now described. Preferably, a service customer accesses CSM functionality through a web-based graphical user interface (GUI), via a programmatic interface, or otherwise. As described above, the CSM component allows customers to define more granular and specific campaign strategies, including pass escalation for alternative channels (e.g., text and email) and/or based upon attempt results, contact attributes and response group data. The campaign strategy manager allows users to define pass escalation strategies statically and dynamically, to manage lists across multiple campaigns, and to view results in real-time. A defined strategy is a static strategy created by a user for a particular campaign that, once created, typically is not modified. A dynamic strategy is one where, during the course of a day (e.g., as a sub-campaign is running), a user may alter the defined strategy, preferably just for that day (or portion thereof).

Although not meant to be limiting, a target user for CSM typically includes client managers responsible for defining a campaign's strategy (who may use the module to set up and define higher level "defined" strategy for a campaign or set of campaigns), or client users who are responsible for managing each day's campaign (in other words, those who use the system daily, load lists, start sub-campaigns and track campaign progress, and who may use the CSM module to make dynamic changes to a campaign or sub-campaign during the day).

CSM Operation

A permitted user associated with the customer accesses CSM to develop a campaign or modify an existing campaign. As noted above, a campaign typically includes one or more sub-campaigns, each of which operates on a contact list. List management typically involves a user loading a list into the system (e.g., using web-based tools, FTP upload, or the like) and then dividing the contacts among different campaigns, typically based upon selected contact attributes.

By way of additional background on the list management operation typically works as follows. At the account level, a user creates and saves a list segmentation rule set, defining criteria for each of one or more subsets of the list, and assigns each such subset to a campaign (existing or new) in the user's account. Preferably, each rule corresponds to a single campaign, and the rule can be based upon one or more fields for the contact. A given criterion can either be included or excluded, or can be part of a nested rule. A user is able to define Boolean logic to create a given list segmentation rule, using a set of terms and operators (e.g., AND, OR, XOR, GREATER_THAN, LESS_THAN, EQUAL, etc.). When the user loads a list, the list need not be loaded into a specific campaign. Rather, preferably the user loads the list into the account and selects the rule set to be applied for segmenting the list. The system then applies the rule set to the list, preferably one rule at a time, as follows. All contacts matching the first rule are put into a separate sub-list and sent to the corresponding campaign, where a sub-campaign is created for that sub-list. All remaining contacts matching the second rule are put into a separate sub-list and sent to the corresponding campaign, where a sub-campaign is created for that sub-list. This continues until all rules have been applied or the original list is empty. If any contacts remain after all rules have been applied, those contacts are put into a separate sub-list and assigned to a campaign that has been identified as a "catch-all" for "leftover" contacts. Preferably, a sub-campaign also is created for that sub-list. The system can report to the user the number of sub-lists created, the number of contacts assigned to each sub-list, and for which campaign each sub-list is designated. After the original list is divided, the system preferably applies campaign-level filtering to each sub-list as it is added to its respective campaign. A user is able to see summary and detailed reports consolidated for the entire list loaded.

Campaign Strategy

A campaign strategy typically includes one or more components including a name, a script, a skill group, and reporting options. The campaign strategy is a subset of these components, and it typically includes one or more of the following: campaign level filtering; pass pattern; namely, escalation type (none, contact-based, call pass-based and intra-pass device escalation), and number and type of passes (voice, text or email). Each pass itself can include components such as: pass level list filtering, contact accept criteria, delivery timeframe, delivery options, and re-try options.

The CSM advantageously enables the user to add passes and to define escalation types. Regarding the addition of passes, when creating a campaign, a user can start with zero passes and can use CSM to add a pass of any type (e.g., voice, text, email, AVM, or the like) to the pass pattern. The system does not require that a default pass be any particular type. Escalation types dictate how the system should escalate with re-tries within each pass. A user can choose one of the following: no escalation type, contact based escalation, call pass-based escalation, intra-pass device escalation, or the like. Contact-based escalation requires customers to assign priorities within the list, preferably before the list is load. With contact-based escalation, a user can set the system to try to contact a customer at multiple devices in the same pass. Call pass-based escalation enables a user to assign the system a single device per customer per call pass. Intra-pass device escalation provides two (2) distinct options: yes or no. If the user selects "yes," for each pass the user views a list of devices, the user can move the devices up and down on the list to prioritize the contact order, and for each device, the user can select whether to contact it if the system reaches that device and it is the correct type for the pass. When the sub-campaign is running, the system will then try to contact the customer via the highest priority device on the list that exists and is of the proper channel; if the customer is not reached, the next re-try will be at the next highest priority device that meets those qualifications, and so forth until the customer is reached or the system has exhausted the re-tries in that pass. If there are x re-tries and <x devices, the user also has the option of looping through the list of devices. For voice passes, preferably the user can add another level of logic to control the system to contact a particular device only if it is a cell phone or landline, or has some other configurable characteristic.

The CSM enables pass level filtering, which is now described. Preferably, there are two levels of list filtering. The first level of filtering preferably takes place when the list is first loaded into a campaign or after it has been segmented into a campaign list via the list management functionality described above. Contacts filtered at this time preferably are not attempted in any pass. Depending upon the type of campaign a user is running, it may be desired to filter (such as to remove duplicate contacts, to filter out cell phones for an all-voice campaign) at the campaign level. In the alternative, it may be desired to perform filtering at the pass level. According to this disclosure, at the pass level stage, users can optionally select one or more additional filtering options that apply only to that pass. Contacts filtered at the pass level stage are returned to the list at the following pass, and they are then reflected in the system database as being filtered. An example of such contacts are those with only an email address, which might be sensibly filtered at the voice pass (in a multi-channel campaign) but which should not be filtered at the email pass. Filter criteria may be quite varied and may be selected from the following: general filters (e.g., duplicate position, duplicate list, duplicate contact), phone number filters (e.g., wireless, no time zone, on "do not contact" list, international, ends with "00," "ends with "000," contains an extension, email), text filters (e.g., landline, no time zone, on "do not contact" list, international, email), email filters (e.g., no time zone, on "do not contact" list, international, text address), state filters, time zone filters, dynamic filters, and contact history suppression. All of the campaign level filter criteria (such as defined above) should also be available at the pass level, except for the general criteria. Preferably, any contact that has been filtered at the campaign level is not visible at the pass level.

Pass Escalation Accept Criteria

When a list is loaded into a multi-pass sub-campaign, preferably contacts can be moved from pass to pass according to any of the following rules. The user may designate (through CSM) that the list accept contacts from the previous pass, from all passes, or from a specific pass or set of passes. In the alternative, pass escalation contact accept criteria may be based upon any of the following criteria: status, contact attributes (e.g., any field currently associated with a record, some other "contact attribute"), and/or response groups (e.g., any response group and included options defined in the script for that campaign). In the latter case, the CSM is able to dynamically obtain the response group information from the script to given the user the correct options. Criteria can be included or excluded using the configuration tool, and criteria can be part of a nested rule. A user can apply Boolean logic to create a pass escalation rule, using any terms and operators.

Dynamic or Static Pass Escalation

The CSM facilitates configuration of dynamic and static pass escalation operations, as is now described. Pass escalation based upon the above-described definitions may be a static, defined campaign strategy, in which case the strategy is applied to every sub-campaign when a list is loaded and a sub-campaign begins. In the alternative, pass escalation may be a dynamic real-time decision made by a customer, e.g., via the UI, programmatically or otherwise, as the campaign itself actually is progressing in real-time. Typically, this is within a given day ("intra-day"), but intra-day pass escalation is not a limitation. Using the CSM UI, for example, the user has the ability to change the given strategy to meet real-time (or quasi-real-time) requirements. Any criteria that the user can select for a static campaign strategy preferably can be selected when dynamically modifying the campaign strategy.

Other CSM Functions

CSM enables the user to create a single-pass, event-based sub-campaign for each channel of a multi-channel campaign. A channel is one of: voice, text, email, AVM, or some combination. CSM exposes one or more strategy templates that can be pre-populated (offline or external to the runtime system), and then uploaded to the system for execution with respect to a particular campaign. In one embodiment, the strategy template is created in XML, and it defines specific aspects of a campaign strategy including number of passes, contact accept criteria for each pass, delivery timeframe, delivery and re-try options, and filtering options. When a user creates the defined strategy for a particular campaign, preferably the CSM provides an option on the page to upload a strategy template. If the user selects that option, he or she can upload a previously-created template. The campaign strategy is then automatically populated with the strategy from that template. Using CSM, the user then can elect to make additional modifications to the strategy after it has been uploaded, or during campaign runtime (dynamically). If a user has already defined a campaign strategy for future use and then elects to upload a template, as a configurable option the existing strategy may be overwritten by the strategy in the template. If a user desires to save the current campaign strategy for future use, the user preferably has the option, when looking at the defined strategy for a particular campaign, to "save" the strategy. If the user elects to save the strategy, the system may automatically create a strategy template (with that campaign's defined strategy), and then download the template (or otherwise make it available for delivery) to the user's workstation.

The web-based CSM GUI exposes summary or detailed reports for each list loaded into the system. A summary report may provide a side-by-side comparison of results for two or more campaigns, or two or more sub-campaigns within a campaign, and so forth. Preferably, the UI provides real-time or substantially real-time updated summary information for a campaign in progress. The UI preferably includes conventional web page control widgets (e.g., fill-in forms, drop-down lists, radio or other control buttons) for static strategy definition, and dynamic real-time strategy modification. The UI may include a separate page or pages to facilitate the list building function.

One or more functions of the CSM are exposed through a system application programming interface (API) to enable extensions, and/or to facilitate interoperability with customer systems if desired.

As used herein, "CSM" should be broadly construed to refer to machines, devices, processes, applications, utilities, software interfaces, display interfaces, configuration files, data structures and data, that facilitate one or more of the above-described functions and features.

Figure 3:
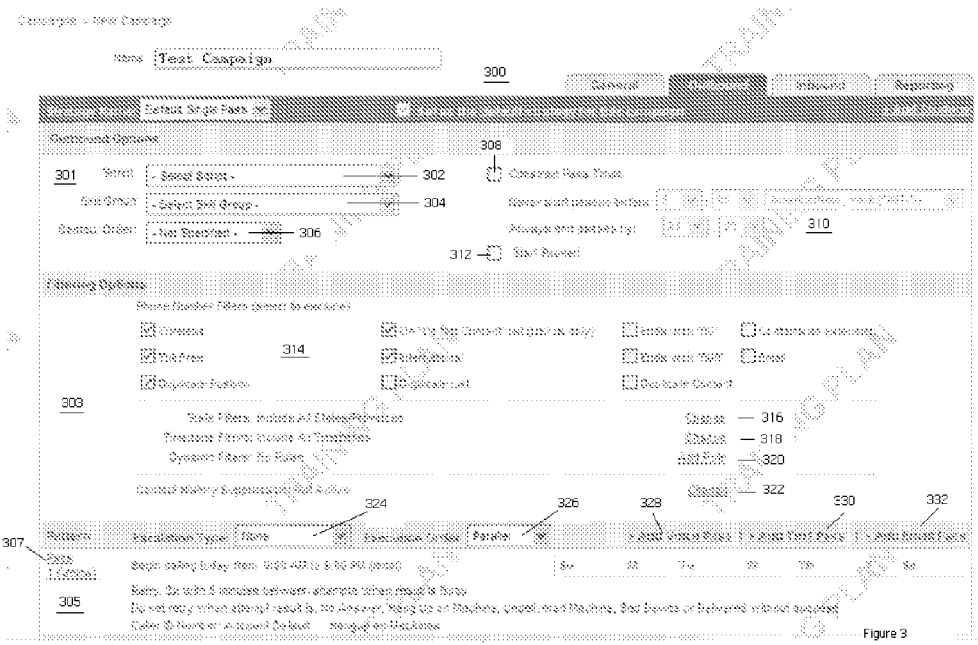
FIG. 3 is a portion of a representative campaign strategy manager (CSM) user interface according to the teachings disclosed herein.

FIG. 3 is a main setup page 300 for a representative CSM user interface (UI). In one embodiment, the interface is enabled from a web-based portal application, preferably over a secure connection. As can be seen, this particular interface includes a set of tabs that expose pages (or display screens) for various campaign management functions. The illustrated page is the tab for creating a new Outbound campaign.

The page 300 exposes a set of Outbound Options 301 including Script selection listbox 302, Skill Group selection listbox 304 and Contact Order listbox 306. The user can Constrain Pass Times by selecting the checkbox 308, which selection then exposes a further set of timing controls 310 by which the user can configure the temporal constraints. A Start Paused checkbox 312 enables the user to configure the start time for the campaign.

A set of Filtering Options 303 include a number of checkboxes 314 for phone number filtering. State and Timezone filters can be added as needed by selecting the appropriate Change link 316 or 318, or a Dynamic Filter can be added by selecting the Add Rule link 320. Contact History Suppression can be modified by selecting a Change link 322, with the default state being inactive.

A Pattern section 305 identifies one or more passes that will be implemented in the campaign. As illustrated, a first (Voice) pass has been provisioned with the characteristics shown. The details of this configuration can be changed by selecting the link 307. The Pattern section 305 of the interface also exposes additional controls for Escalation Type (dropdown list 324) and (if there are multiple passes specified) Execution Order (dropdown list 326). Additional passes (voice, text, email, etc.) are added by selecting the links 328, 330 and 332.

Figure 4A:
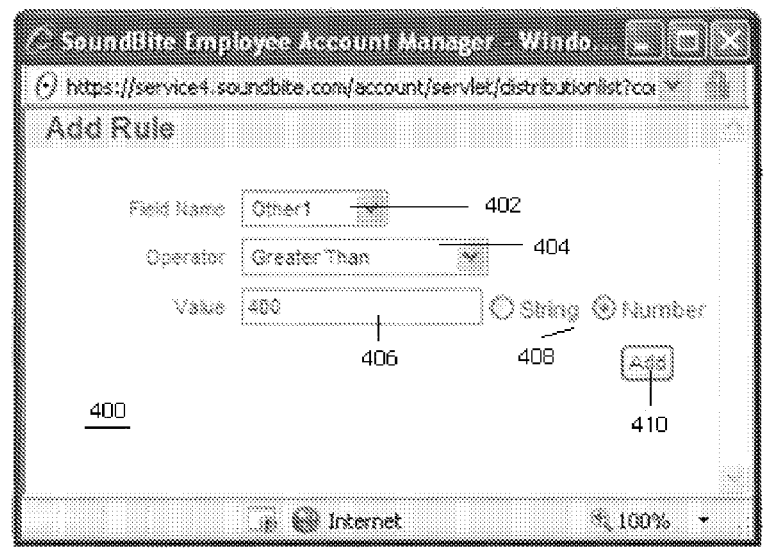
FIG. 4A is a display interface by which a user can configure a dynamic rule.
Figure 4B:
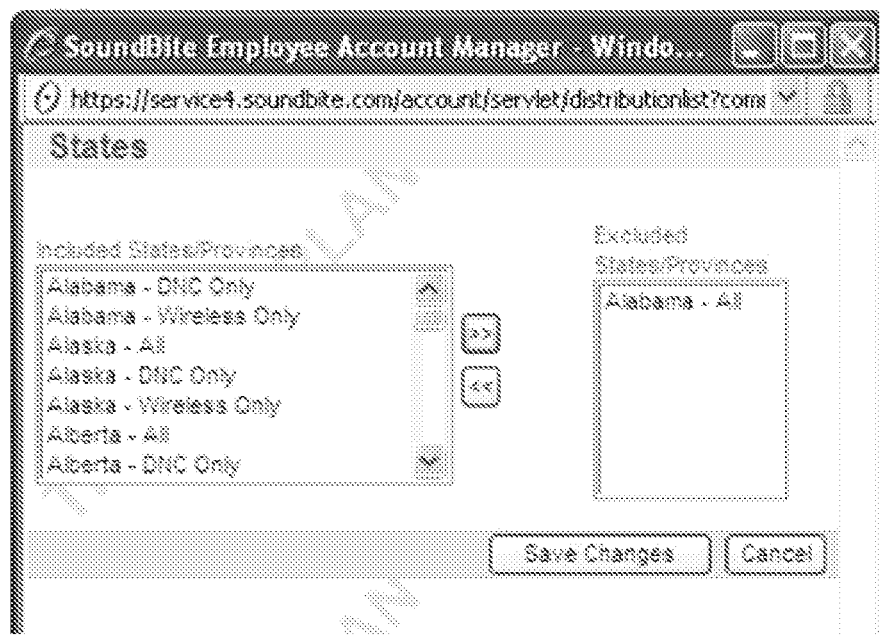
FIG. 4B is a display interface by which a user can configure a static option.
Figure 4C:
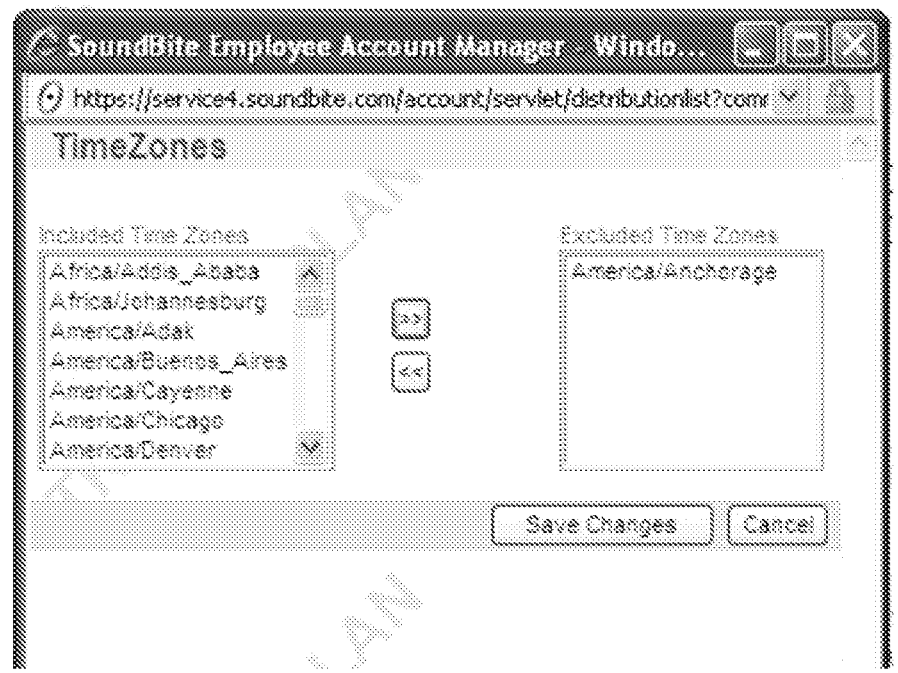
FIG. 4C is a display interface by which a user can configure another static option.

FIG. 4A illustrates an Add Rule window/page 400 that is displayed when a user selects the Add Rule link 320 in FIG. 3. The page 400 includes a Field Name listbox 402 by which the new rule can be named, an Operator listbox 404 from which an operand can be selected, and a Value fill-in field 406 by which the user can define the operand value. Radio buttons 408 enable further refinement, and the rule is added by selected the Add button 410. FIG. 4B illustrates the State filter that is reached by selecting the Change link 316 in FIG. 3, and FIG. 4C illustrates the Timezone filter that is reached by selecting the Change link 318 in FIG. 3.

Figure 5:
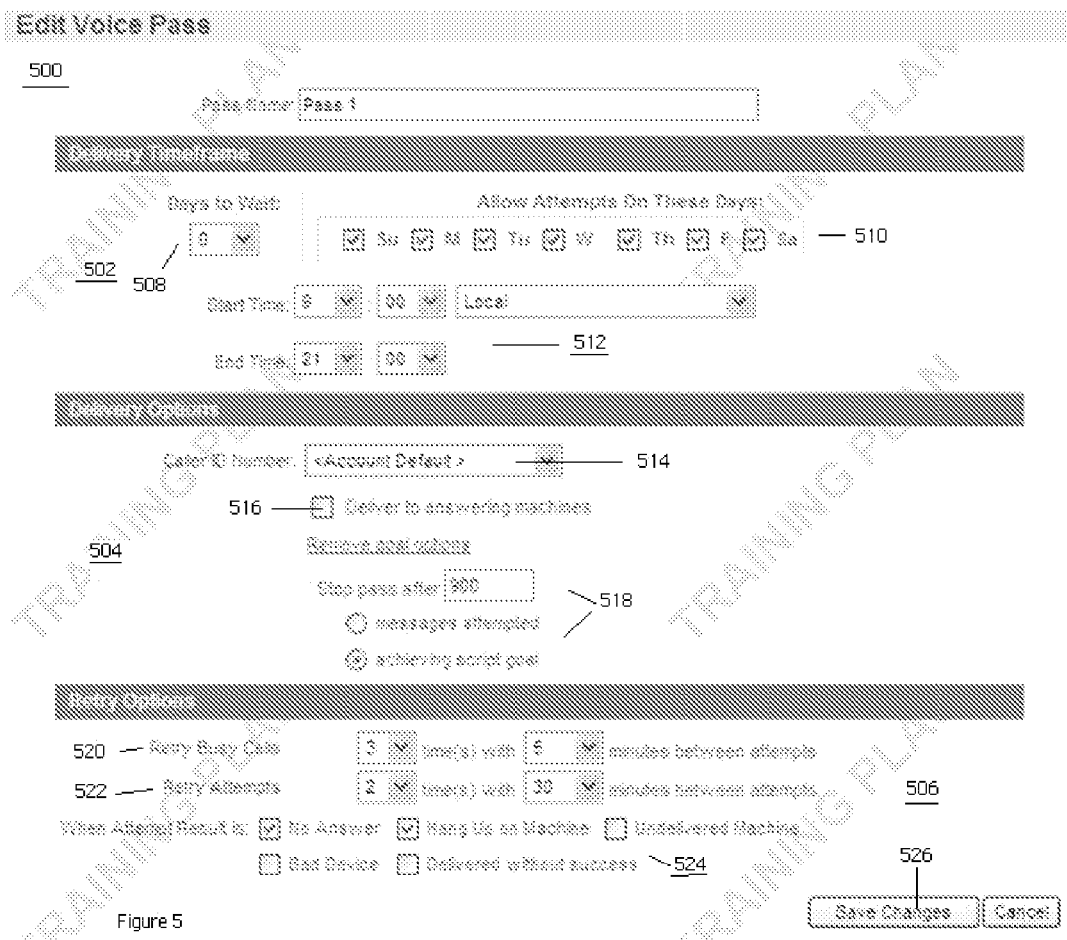
FIG. 5 is a display interface for editing a given campaign pass.

FIG. 5 illustrates an Edit Pass window/page 500 that is used to edit the currently-configured (in this example) voice pass. This page is reached by selecting the link 307 in FIG. 3. The Edit Pass screen 500 includes a delivery timeframe section 502, a delivery options section 504, and a retry options section 506. The current configuration settings (as indicated in FIG. 3) are shown. The delivery timeframe section 502 includes appropriate controls to configure days to wait 508 and checkboxes 510 to identify what weekdays attempts will be carried out. Start and end time controls 512 are also provided as shown. The delivery options section 504 includes a Caller ID number listbox control 514, a checkbox 516 to identify whether the calls should be left with a contact's answering machine, and one or more Remove goal option controls 518. The retry options section 506 provides a Retry Busy Calls configurator 520, as well as a Retry Attempts configurator 522, together with a set of checkboxes 524 that identify when these configurations should be used. A Save Change button 526 is used to store the pass configuration or changes.

Figure 6:
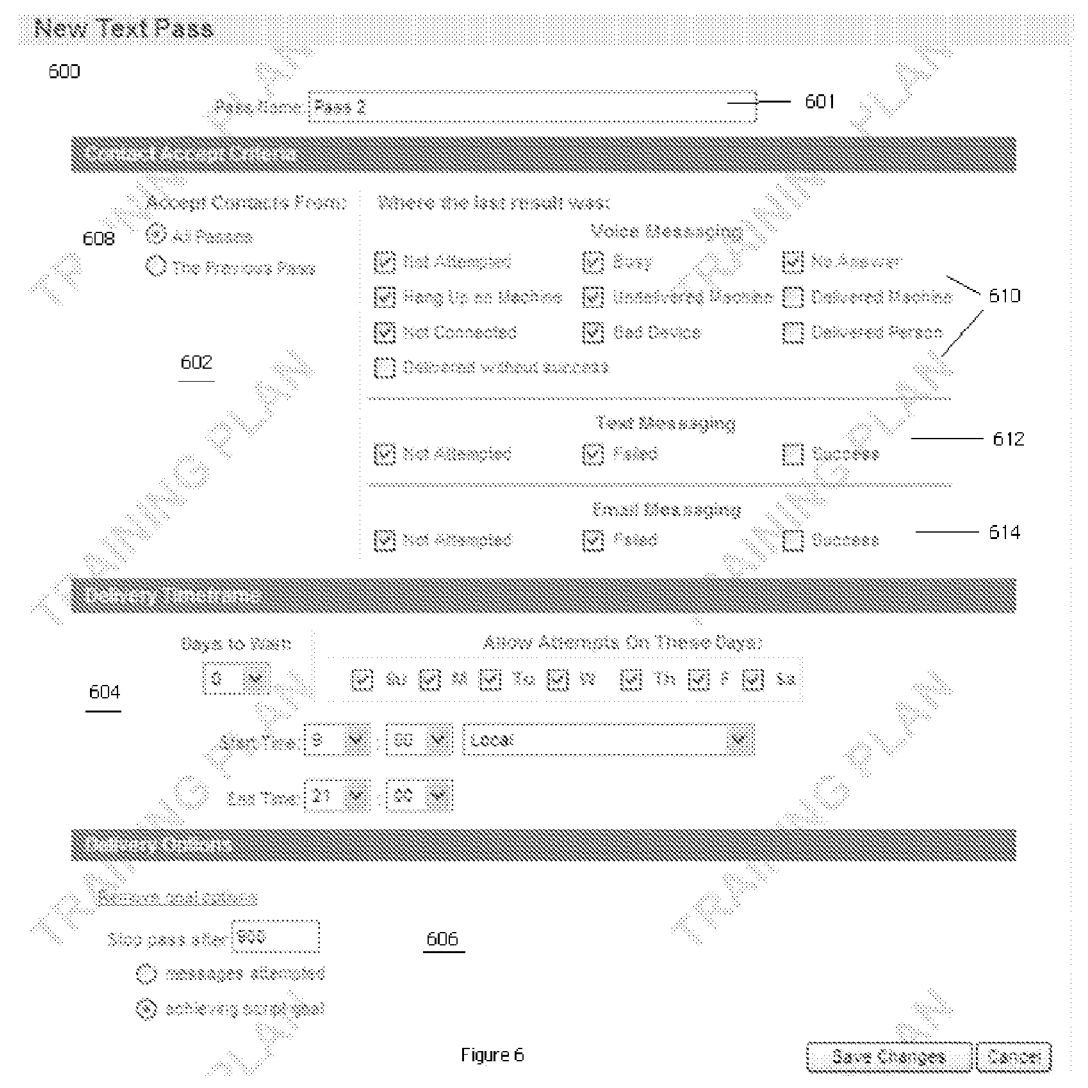

FIG. 6 illustrates a New Text Pass window/page 600 that is used to create a new text pass. This page is reached by selecting the link 330 in FIG. 3. After naming the pass in field 601, the user can configure Contact Accept Criteria in section 602, a Delivery Timeframe in section 604, and Delivery Options in section 606. The Contact Accept Criteria section 602 includes a first set of radio buttons 608 by which the user can configure the pass to access contracts from all passes or just the previous pass. The acceptance criteria can also be based on the type (voice 610, text 612, or email 614) of the last attempted contact, and the outcome of that last attempt as indicated by the checkbox or boxes configured. The Delivery Timeframe section 604 includes similar controls to those shown in the Voice pass example, as does the Delivery Options section.

Of course, the above-described and illustrated interfaces are merely exemplary of the basic types of configuration options that may be implemented. One of ordinary skill will appreciate that additional displays, menus, fields, controls and configurator elements may be used as needed or desired to implement the CSM functionality described herein. As also seen in FIG. 3, the CSM UI is not limited to provisioning Outbound campaigns, as the CSM UI preferably also includes Inbound Campaign configuration screens, as well as screens for general administrative and reporting functions.

As used herein, the term "page" or "screen" should be broadly construed to include windows, display panels, display containers, pages, sub-pages, and the like.

Although not meant to be limiting, preferably the UI interacts with the user's web browser using advanced Web 2.0 technologies such as AJAX (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client.

Illustrative use Cases

The campaign strategy manager provides many advantages. The following use cases are merely representative.

A user is running an interactive campaign (automated voice message (AVM) or dialer) and realizes that there are two hours left until the campaign ends, but that too many contacts are left on the list to be able to attempt to reach all of them. Using the CSM, the user changes the campaign type to an AVM alert-based campaign to ensure that everyone on the list receives some sort of contact, even if just an alert.

As another example, assume that a contact center is overwhelmed with calls at 9:00 am and cannot handle all of them. The operator desires to slow down the communications campaign. Slowing down the campaign, however, means that the operator risks not getting through the predefined list. As a compromise, when call volume becomes too high, the CSM is used to switch the campaign from interactive to alert (e.g., for a percentage of the list) to lessen the burden on the contact center. When "peak time" is over and the contact center returns to a manageable call volume, it uses CSM to return the campaign to an interactive mode.

As another example, assume a campaign begins in the morning. Towards midday, however, a hurricane hits some portion of the country that in part is targeted by the campaign. The user dynamically enters a change through the CSM to exclude all contacts with area codes in that part of the country. For the remainder of the day, the campaign continues as planned, except no attempts are made to contact anyone in the affected area.

As yet another example scenario, a customer behavior-based strategy is implemented. In this case, the CSM can be used to define a condition by which an alternate channel may be tried. So, for example, if an end user has not responded to an automated voice message in a given time period, a text message is then sent. Or, if the last several text attempts to the end user were unsuccessful, attempts to reach the end user over that channel may be stopped for a given time period.

An enhanced campaign strategy may be implemented where a single list is used for multiple campaigns based on a single attribute. Thus, consider a list of customers that are, for example, 1-10 days delinquent on their payments. The user desires to create a campaign to remind those customers of the delinquency. The single attribute here is the length of the delinquency, measured in days. Using CSM, customers that are one day delinquent get different treatment than those two days delinquent, and so forth. In this scenario, the user provides the service provider a full list each day, and the list is broken up based on the number of days delinquent. Each subset of the list is associated with a different sub-campaign, where it gets a different treatment. At the end of the day, by way of example, the provider returns to the user the results of all campaigns (preferably in a single report). The user can then create a new list to send to the operator the next morning.

The CSM may be configured to provide other types of contact history-based escalation. Thus, for example, assume the user sends the service provider a list of delinquent customers to be contacted each day. The same customer can easily be on the list for multiple days. If the service has attempted to contact the customer via a given channel (e.g., voice) for a given time period (e.g., five days), then the service then tries to reach the customer via an alternative channel (e.g., a text message) for a next given time period, and so forth. Thus, using CSM the service accepts customers in the text pass if the service has not sent them a text message in that prior period.

An enhanced campaign strategy may be implemented where a single list is used for multiple campaigns based on multiple attributes. In an example, the user desires to split a list by using various query criteria covering a number of different data fields such as state, last payment date, and current balance. Assume by way of example that the user defines a large number (e.g., 25) queries based on a given set (e.g., 7) different fields in a customer data record. The system receives a master list from the user; by executing each query preferably one at a time the list is split 25 ways. The queries preferably are run in order of importance to the user so that contacts that might match multiple queries end up in the correct list. In this example, the last query may be a catch-all for any remaining contacts. The system then has 25 lists, based upon the queries, and those lists are loaded into the system for 25 different start-paused sub-campaigns.

A single contact list may be used for multiple campaigns based on direct-connects, where a particular direct-connect is associated with one of a set of contact centers. Thus, for example, a user loads a single list into the system, with the list split into two different sub-campaigns, one for each contact center (per direct-connect number). During the day, one of the contact centers has an emergency and needs to go off-line. In this case, the CSM is used to stop that associated sub-campaign for that contact center only, while the other sub-campaigns proceed as normal.

The CSM may be used to configure a contact-based pass escalation based on device dependencies. Thus, in this example, assume a user desires the system to follow the following logic during a given contact pass (as defined in the script): (1) try calling the customer's home number; (2) if the system does not reach the customer at the home number, determine whether the customer's work number is a cell phone; (a) if the customer's work number is a cell phone, try calling the customer at that number; (b) if the customer's work number is not a cell phone, try another channel such as email. Using CSM, the user then sets various parameters for the contact-based pass escalation to ensure that the customer is only contacted on the work number if that number is a cell phone.

The CSM may be used to configure device escalation logic over a single channel where the system, if it fails to reach the customer through one device, then attempts to reach the customer on a different device.

The CSM may be used to configure unique device contacts regardless of customer association. In this example, assume the user loads a list of 1000 customers, where each customer has a few devices that might be contacted via text. Assume further that the user desires to be able to attempt multiple customer devices in a single pass (text, with re-tries). Also, if a particular device has already been attempted for a given customer and the device shows up for a second customer, the user desires not to attempt that device for a second time in the same pass. The CSM can be used to set up to implement this unique configuration.

As another example, the CSM can be used to facilitate dynamic addition of re-tries to reach a right party (skip trace calling). In this scenario, the user (via AVM or dialer) attempts to reach a customer but reaches someone who is not the "right party" (as that term is known to one of ordinary skill in the art). Here, CSM can by configured or controlled to add re-tries to that pass with different devices in an attempt to reach the right party.

The ECM can be used to implement results-based pass escalation. Preferably, a results-based pass escalation strategy is based upon a possible value in a "status" field. For example, using CSM the user creates a multi-pass, multi-channel campaign strategy such as the following: pass 1 (voice)—entire list; pass 2 (text)—customers not reached in pass 1 (i.e., status other than DELIVEREDPERSON or INBOUND_IVR_COMPLETED); pass 3 (email)—customers who did not respond in pass 2 (status other than TEXT_MSG_RECEIVED or TEXT_MSG_OPT_OUT); pass 4 (AVM)—all customers who have not been reached live or responded to text and email passes. With text and email, where responses are not immediate and status can change, a contact flows into the next pass when that pass begins, and preferably not when the previous pass is completed. This allows for as much time as possible for a status change. The results-based pass escalation may also be dynamic. Here, assume a simple campaign strategy with a single voice pass (for example). Midway through the pass, however, the user notices a lower than usual response rate. Using CSM, the user changes the strategy dynamically to add a second text pass targeting all customers not successfully contacted during the first pass.

The CSM also facilitates attribute-based pass escalation strategies, as will now be described by example. Typically, an attribute-based pass escalation is based upon any customer attribute, such as a contact attribute (age, demographic data, etc.), deviceLocale, deviceTimezone, and the like. The following are representative examples of this approach, but the examples should not be taken to limit the scope of the invention.

In a "defined" approach to attribute-based pass escalation, the user creates a multi-pass, multi-channel campaign strategy such as the following: pass 1 (text)—customers under age 35; pass 2 (AVM)—customers over age 35; pass 3 (AVM)—customer who did not respond in pass 1. An alternative example provides attribute-based escalation to a subset of the list: pass 1 (voice)—all customers; pass 2 (voice)—customers not reached during pass 1 with risk values of A, B or C; pass 3 (voice)—customers not reached during pass 2 with risk values of A or B; pass 4 (voice)—customers not reached during pass 3 with risk value of A. Yet another example provides attribute-based escalation for different passes in different time zones: pass 1 (voice)—customers in EST (starts at noon EST); pass 2 (voice)—customers in CST (starts at noon CST); pass 3 (voice)—customers in MST (starts at noon MST); pass 4 (voice)—customers in PST (starts at noon PST).

In a "dynamic" approach to attribute-based pass escalation, assume (by way of example only) the user creates a simple strategy for the day with several passes. In one example, CSM is used to dynamically add a channel for a specific customer segment during the day. So, after the first pass, assume the user notes a lower than usual response rate for voice and dynamically adds a text pass for customers under age 35. In a second example, CSM is used to dynamically escalate to a subset of the list. Continuing with the above example, assume that later that morning the user decides that in the interest of time, the user would prefer to only contact customers with a risk value of A. The user then dynamically adds a new pass or changes an upcoming pass to only contact customers with that attribute. In a third example, CSM is used to dynamically change time zone preferences. Continuing with the example, assume that at about noon EST, the user decides to focus on EST-located customers. The user dynamically changes an upcoming pass to only contact customers with devices located in the EST. A few hours later, the user then decides that all customers, regardless of time zone, should be contacted again; the user then dynamically changes upcoming passes so that time zone is no longer relevant.

The CSM also facilitates response group-based pass escalation, wherein the escalation is based upon whatever response groups have been defined in the script. In a "defined" approach to response group-based pass escalation, for example, the user defines a campaign strategy where the response group is "re-try failed direct-connects." An example strategy might then be the following: pass 1 (voice)—all customers; pass 2 voice, AVM or predictive)—customers that tried to direct-connect in pass 1 but were successful. Another example strategy might be a response group defined by a given customer response, such as: pass 1 (voice)—all customers; pass 2 (email)—customers reached during pass 1 that pressed '3' (where the script had instructed customers to press that number to be emailed a copy of their current statement).

In a "dynamic" approach to response group-based pass escalation, assume the user creates a simple strategy with a set of passes. Midway through the day, the user notices that a lot of customers have hung up while on hold with the contact center. Using CSM, the user dynamically adds a pass to re-try this response group, namely, the users that have hung up while on hold.

All of the above examples are merely exemplary and are provided to show the significant configuration flexibility afforded by CSM. They should not be construed to limit the scope of the disclosed subject matter.

Customer Recovery

The following describes a new customer recovery strategy. This strategy may be provisioned by the CSM to address a common scenario in which a target call recipient hangs up on an AVM or is not patient enough to wait through an AVM message. This strategy implements a so-called "dialer pass," which is a voice pass in which call recipients are connected immediately to an available agent, preferably using a direct bridge, without any script interaction.

The following definitions apply. A "dialer pass" preferably is a voice pass in which call recipients are connected immediately to an available agent via "direct bridge" without any script interaction. A "direct bridge" is a connection to an agent that preferably is bridged through the duration of the agent's time logged into an agent portal associated with the hosted system. Direct bridge connectivity involves having an agent establish a connection to the service provider that remains "open" for the duration of the agent's session. Preferably, an agent establishes a connection to the service provider hosted system, either by dialing to a number provided by the service provider, or the service provider calling the agent, and the agent remains connected. This enables calls connected to live parties or answering machines to be bridged to the agent as soon as answering machine detection has been completed. A fast answering machine detection algorithm to detect machines (preferably in a sub 2 second time frame) enables the "immediate" connection of the call recipient to the agent. A "dialer script" associated with a dialer pass does not have any initial message and bridges immediately to an available agent.

A dialer pass typically differs from an AVM pass in that no outgoing message is played to the call recipient when a call is connected. Instead, according to this approach, the system preferably performs shortened answering machine detection and either makes an immediate connection to an available agent, puts the call into a hold queue, or terminates the call based on contact center preferences. To support the dialer pass, the available agent should be connected in a short period of time, and the agent should have context information available associated with the outreach. An agent screen pop via an agent portal may be used for this purpose; in the alternative, a web services API may be used to integrate the agent with a contact center infrastructure (or call routing infrastructure) so that the necessary data can be provided to the agent.

Using the CSM, the dialer pass can be integrated by the customer into the strategy Preferably, the sub-campaign is provisioned to run two (2) passes in parallel (concurrently, or overlapping): (i) an AVM pass, and (ii) a dialer pass, with predictive pacing used to control the pacing. Provisioning may be implemented using a set of display interfaces, preferably as follows.

Figure 7:
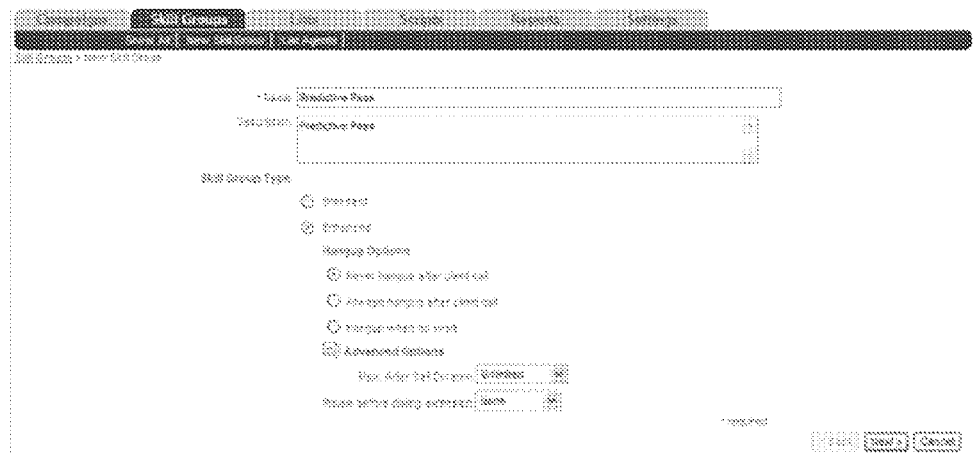
FIG. 7 is a display interface for defining a predictive skill group.
Figure 8:
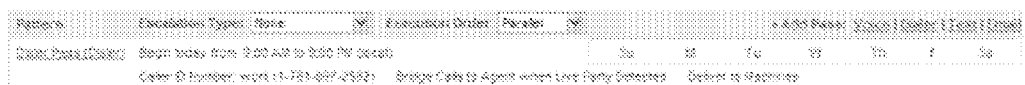
FIG. 8 is a display interface for identifying execution constraints associated with a dialer pass.
Figure 9:
FIG. 9 is a display interface for defining pacing options associated with the dialer pass.
Figure 10:
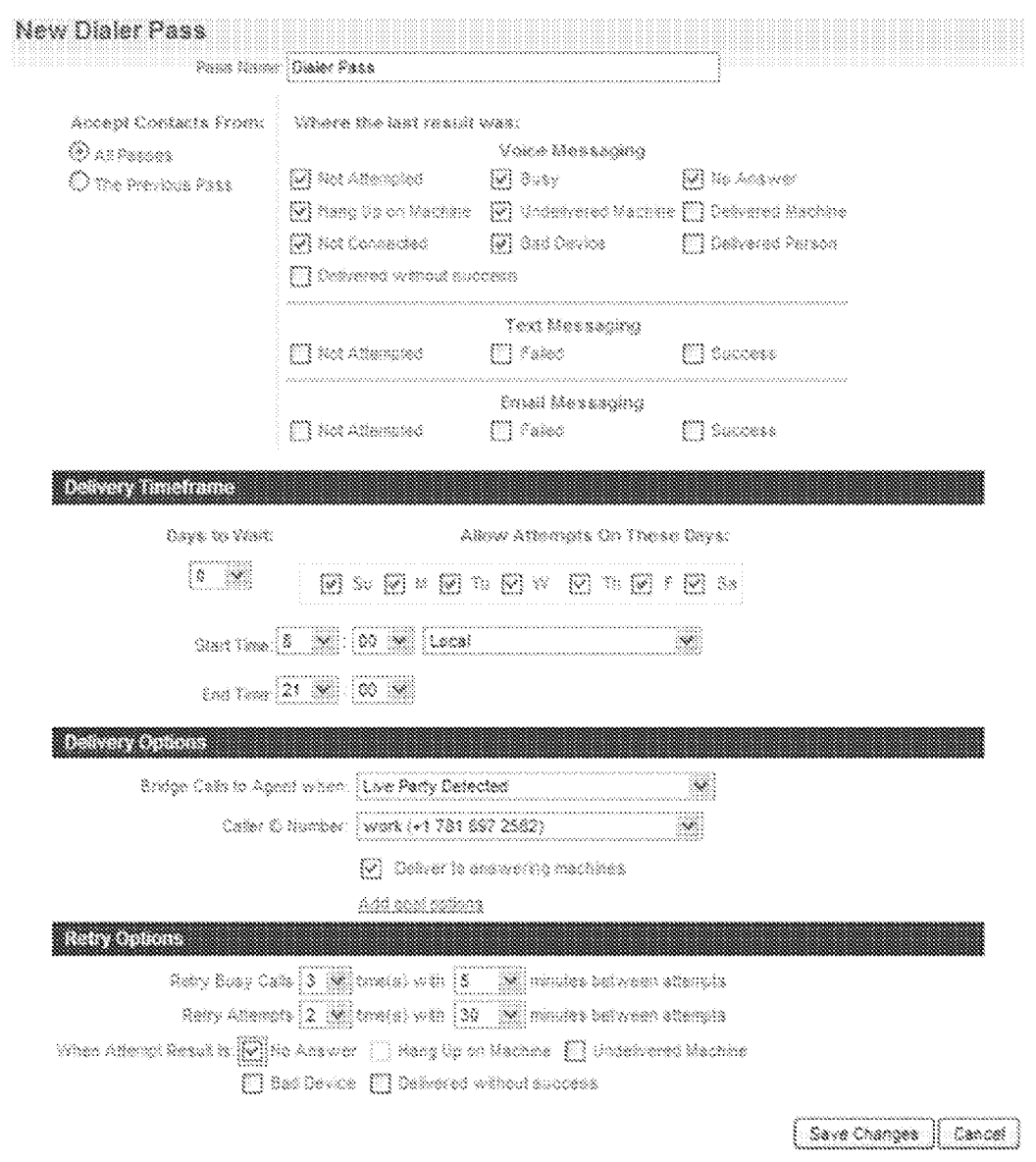
Figure 11:
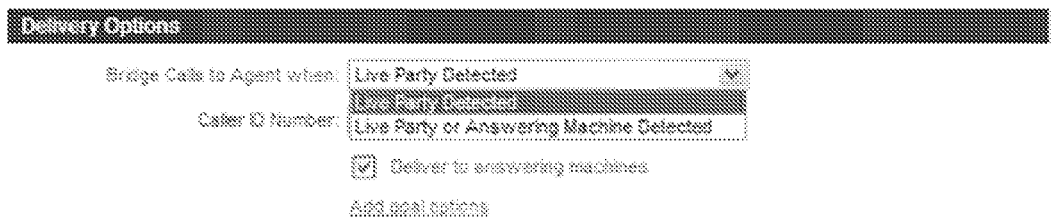
FIG. 11 is a portion of the display interface of FIG. 10 illustrating available delivery option configurations.

FIG. 7 is a display interface for use in defining a new skill group, called Predictive Pass, which includes the particular "enhanced" attributes shown, including a "Never hangup after client call" option. Setting up the campaign involves the creation of the "dialer pass" using the interface shown in FIG. 8, for example. The dialer pass in this example has a certain define time period and strategy as shown. The call pacing utilizes a set of pacing options, such as configured in the display interface of FIG. 9. To set up the dialer pass, the customer decides on what connection types to pass to the agents. FIG. 10 illustrates a display interface for use to configure the dialer pass. The delivery options are shown in detail in FIG. 11. Using the interface, the customer may choose to bridge only detected Live Parties, or both Live Parties and Answering Machines (should they want agent to leave "personalized" messages). The type of detection is displayed to the agent.

The addition of the dialer pass enables a customer to incorporate the pass into their strategy. A common pass strategy in collections, for example, might be AVM→AVM→dialer.

As contact preferences are established and contact patterns defined, it may be determined that some call recipients are not receptive to AVM, text, email, or the like; as such, using the approach herein, that type of audience may be targeted through a dialer pass wherein the call recipient is not given the change to avoid communication with a calling party (such as a collection agency that is using the hosted platform).

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having described our invention, what we claim 1s set forth below.

The invention claimed is:

1. A computer program product in a non-transitory computer readable medium for use in a data processing system for managing interactive communications campaigns, wherein a given campaign comprises one or more sub-campaigns, the computer program product holding computer program instructions which when executed by the data processing system perform a method, comprising:

defining a campaign strategy for a campaign, the campaign strategy having associated therewith an automated voice message (AVM) pass, and a dialer pass by which a call recipient may be connected to an available agent immediately without any script interaction;

executing the AVM pass and the dialer pass concurrently so that, upon a given occurrence in the AVM pass, a connection option associated with the dialer pass is executed.

2. The computer program product as described in claim 1 wherein the connection option is immediate connection to the available agent.

3. The computer program product as described in claim 1 wherein the given occurrence in the AVM pass is detection of an answering machine.

4. The computer program product as described in claim 1 wherein the given occurrence in the AVM pass is hangup following answering machine detection.

5. The computer program product as described in claim 1 wherein the method further includes using predictive pacing to control pacing.

6. The computer program product as described in claim 1 wherein the method further includes having the available agent establish a connection that remains open during a session associated with the available agent.

\* \* \* \* \*